UNITED STATES PATENT OFFICE.

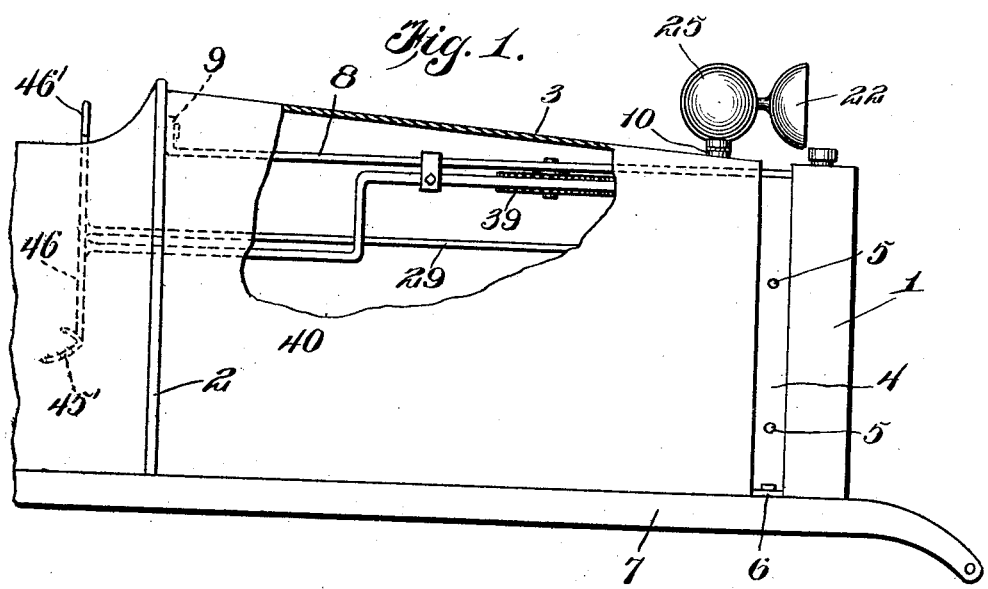
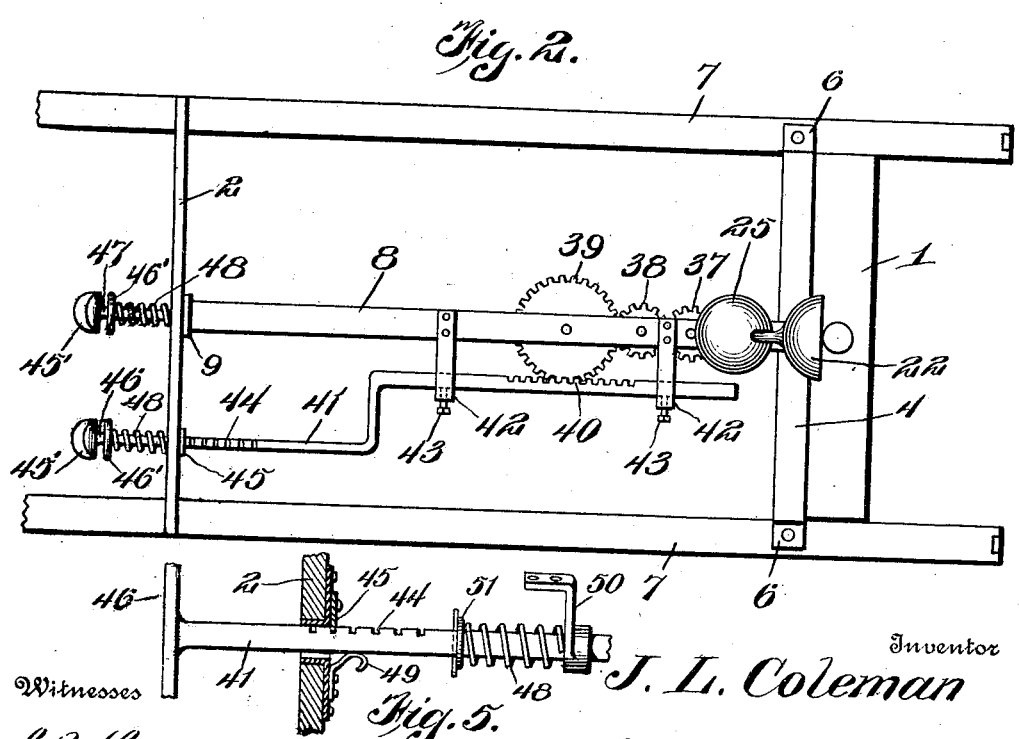

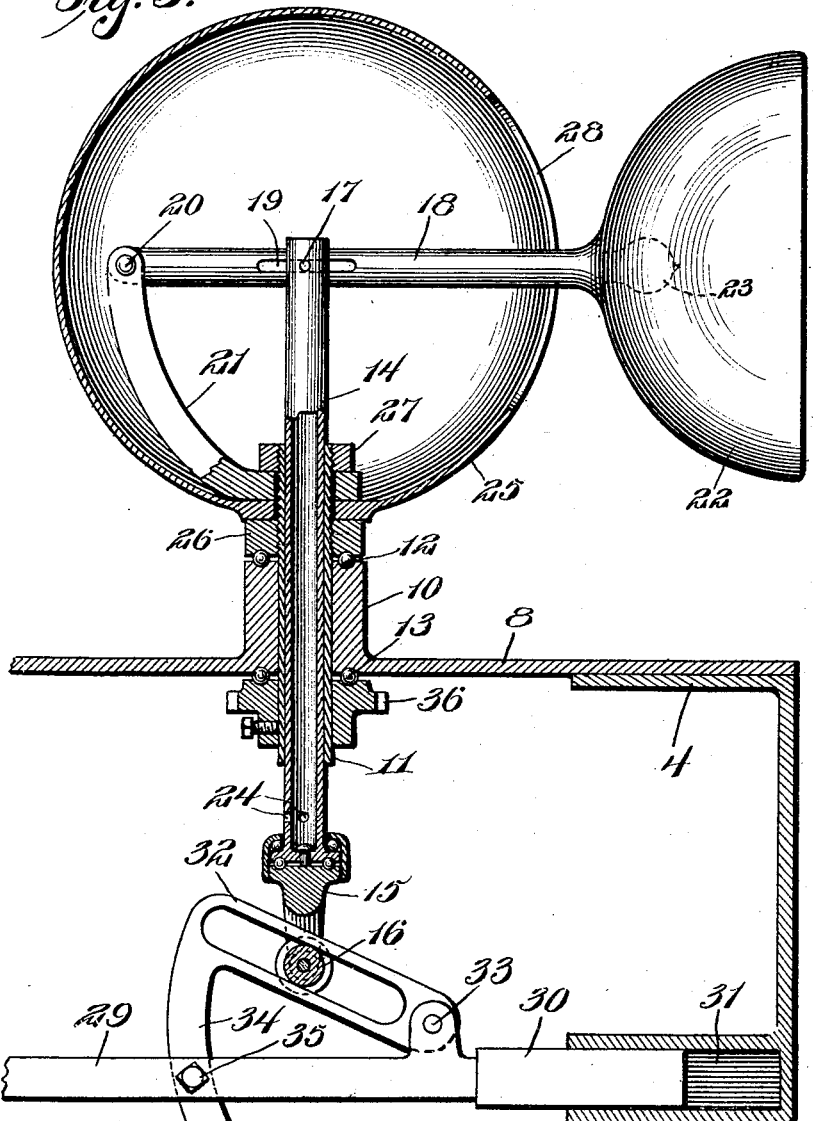

JOHN LASTER COLEMAN, OF TULLAHOMA, TENNESSEE.

HEAD-LAMP CONTROL.

1,203,492.  Specification of Letters Patent.  Patented Oct. 31, 1916.

Application filed February 16, 1916. Serial No. 78,719.

*To all whom it may concern:*

Be it known that I, JOHN L. COLEMAN, a citizen of the United States, residing at Tullahoma, in the county of Coffee and State of Tennessee, have invented new and useful Improvements in Head-Lamp Controls, of which the following is a specification.

This invention relates to headlamp controls, the object in view being to provide a headlight especially designed for use upon automobiles and other motor driven vehicles, the arrangement being such that the light from the lamp may be directed at any angle to one side or the other of a horizontal straight ahead path or to any desired angle above and below the horizontal, the operating means being under the immediate control of the driver in his seat in the machine.

A further object in view is to provide headlamp controlling mechanism of the character above set forth which may be readily applied to the common type of automobile or motor vehicle without interfering with the engine or any of the connections thereof or with the hood, beneath which the major portion of the operating mechanism of the headlamp is contained, concealed and protected.

With the above and other objects in view, the invention consists in the novel construction, combination and arrangement of parts, as herein described, illustrated and claimed.

In the accompanying drawings: Figure 1 is a side elevation partly in section of a sufficient portion of an automobile to illustrate the present invention in its applied relation thereto. Fig. 2 is a plan view of the same omitting the hood. Fig. 3 is a vertical section on an enlarged scale through the lamp post, bearing and adjacent parts. Fig. 4 is a fragmentary section showing the rack face of one of the operating rods and its relation to the fixed catch. Fig. 5 is a fragmentary longitudinal section illustrating a modified arrangement of spring for one of the operating rods.

Referring to the drawings, 1 designates the radiator of an automobile of the present day construction, 2 the dash, and 3 the hood, all of said parts being of the usual construction and arrangement.

In carrying out the present invention, a substantially U-shaped supporting frame 4 is secured to the back of the radiator by means of fasteners 5 such as bolts, said frame having the general shape of the back of the radiator and being provided at the bottom extremities thereof with flanges 6 adapted to receive bolts or rivets inserted through the side frame bars 7 of the machine.

Extending rearwardly from the frame 4 is a substantially horizontal supporting bar 8, the forward end thereof being supported by the frame 4 and the rear end thereof being formed with a flange or head piece 9 which is bolted, riveted or otherwise fastened to the front side of the dash 2. The supporting bar 8 has extending upwardly therefrom adjacent to its forward extremity and close to the radiator, a tubular bearing head 10 through which is inserted a tubular shaft 11. Ball bearings 12 and 13 are interposed between the head 10 and a nut 26 and pinion 36 hereinafter referred to, to enable the tubular shaft 11 to turn with a minimum amount of friction.

Slidable in a substantially vertical direction through the tubular shaft 11 is a lamp post 14 having a swiveled bottom extension 15 provided at the lower extremity thereof with an anti-friction roller 16 the purpose of which will hereinafter appear. The upper extremity of the post 14 is connected by means of a pin or pivot 17 to a lamp supporting arm 18, the latter being provided with a slot 19 to receive the pin or pivot 17 so that the arm 18 may play in the direction of its length upon the pin 17 and relatively to the lamp post 14.

At its rear extremity the lamp carrying arm 18 is connected by a pivot 20 to a bracket arm 21 which has a fixed relation to the upper extremity of the tubular shaft 11 and is therefore immovable in a vertical direction but is, of course, caused to turn with the shaft 11. At its forward end the lamp carrying arm 17 is equipped with a reflector 22 and it also carries a source of light 23 shown in the form of an electric lamp the wires to and from which lead through the arm 18 and the lamp post 14 both of which are of tubular formation, the post 14 being provided with one or more holes 24 to receive said wires which may lead to any convenient or suitable source of electric energy.

Mounted fast on the upper extremity of the tubular shaft 11 is a hollow casing 25. This is shown in the accompanying drawings as in the form of a hollow sphere but it will be understood that any desired shape may be imparted thereto, for example, the shape of a bird or animal to make the whole device more attractive. The casing 25 is fastened upon the upper extremity of the tubular shaft 11 by means of a nut 26 and a jam nut 27 and is provided in the forward portion thereof with a vertically and circumferentially extending slot 28 through which the lamp supporting arm 18 passes and in which it is movable in an up and down direction.

The means for raising and lowering the lamp post 14 and correspondingly elevating and depressing the lamp, comprises an operating rod 29 the forward extremity of which is preferably enlarged and squared as shown at 30 and slidingly received in a socket 31 of corresponding formation carried by and projecting rearwardly from the frame 4. The rod 39 carries an inclined and slotted cam track 32 one end of which is pivotally attached at 33 to the rod 29, the opposite end of the track 32 being provided with an arcuate extension 34 which may be moved upwardly and downwardly in relation to the rod 29 to which it is secured by means of a set screw 35. This enables the angle of the cam track 32 to be adjusted for the purpose of increasing or decreasing the amplitude of vertical sliding movement of the lamp post 14, it being understood that as the rod 29 is moved in the direction of its length, the roller 16 at the bottom of the lamp post is caused to move upwardly or downwardly, the result being that the lamp supporting arm 18 is correspondingly rocked in an upward or downward direction for elevating or depressing the lamp and correspondingly changing the direction in which the rays of light are projected.

The means for imparting rotary motion to the tubular shaft 11 will now be described. Fast on said tubular shaft 11 is a spur pinion 36 meshing with a second pinion 37 which in turn meshes with a third pinion 38 meshing with and actuated by an initial gear 39. The gear 39 is in turn actuated by a toothed rack 40 which forms an offset extension of an operating rod 41 under the control of the driver. The rack bar 40 is mounted to slide in guides 42 supported by the horizontal bar 8. Associated with each of the guides 42 is a set screw 43, said screws serving to adjust the rack bar 40 toward the gear 39 and compensate for wear which may take place between the rack bar 40 and said gear 39.

Each of the operating rods 29 and 41 passes through an opening in the dash 2 and at such point each of said rods is provided with a rack face 44 adapted to engage a fixed catch or lip 45 secured in fixed relation to the dash. On the rear extremity of each of said operating rods and located in rear of the dash and within reach of the operator is a cross head, one of said cross heads being indicated at 46 and the other at 47. Each cross head extends above and below the respective operating rod and is provided at the bottom thereof with a pedal 45' and at the top thereof with a handle 46' thus enabling the cross head and consequently the operating rod connected therewith to be managed either with the hand or foot of the operator. Each operating rod consists of a bar of spring metal, the tendency of which insures an engagement between the rack face 44 thereof and the fixed catch or lip 45 coöperating therewith. This insures the retention of each operating rod at any point where it may be left, and correspondingly maintains the lamp in the position to which it has been adjusted.

In operation, when the driver manipulates the cross head 46, he first exerts a downward pressure thereon either by his hand or foot and then either thrusts the rod connected therewith in a forward or rearward direction. Thereupon, through the medium of the rack bar 40 and the train of gears above described, the tubular shaft 11 is turned in a corresponding direction, causing a proportionate turning of the lamp. To elevate and depress the lamp, the other cross head 47 is manipulated in the same manner thereby sliding the cam track 32 in a forward or rearward direction and correspondingly raising or lowering the lamp post 14 which as previously noted has the effect of swinging the lamp carrying arm 18 upwardly or downwardly.

It will be understood from the foregoing, that by reason of the construction and arrangement described, the lamp may be swung either laterally in a substantially horizontal plane or upwardly and downwardly in a substantially vertical plane. This forms what may be termed a universal mounting for the lamp and therefore the rays of light therefrom may be directed to any desired or given point either while the machine is in motion or at a standstill for the purpose of illuminating any portion of the roadway or any buildings or objects irrespective of the elevation thereof above the ground.

Each of the members 8 and 41 is normally urged rearwardly or toward the driver by means of a spring 48 arranged between the cross head and the dash 2. If desired, the spring 48 may be arranged as shown in Fig. 5, being interposed between a combined guide and bracket 50 and a collar 51 so as to thrust the member 8 or 41 as the case may be toward the driver when released from the stop lip or catch 45. A spring 49 secured to the dash serves to maintain the member 8 or 41 in engagement with the catch or lip 45 and at the same time enables such member 8 or 41 to be depressed for the purpose above described.

Having thus described my invention, I claim:—

1. In search lamp control, the combination of an upright lamp post, a lamp supporting arm having a rocking and sliding connection between its ends with said post, a lamp and reflector carried by one end of said arm, a hollow shaft through which said post is slidable longitudinally, a bracket arm on said shaft to which the lamp supporting arm is pivotally attached, a tubular bearing head in which said hollow shaft is journaled, manually controlled means for elevating and depressing said lamp post, and manually controlled means for turning said lamp post.

2. In search lamp control, the combination of an upright lamp post, a lamp supporting arm having a rocking and sliding connection between its ends with said post, a lamp and reflector carried by one end of said arm, a hollow shaft through which said post is slidable longitudinally, a bracket arm on said shaft to which the lamp supporting arm is pivotally attached, a tubular bearing head in which said hollow shaft is journaled, manually controlled means for elevating and depressing said lamp post, manually controlled means for turning said lamp post, the post elevating and depressing means embodying a swiveled extension of said post, and a slidable cam track inclined with respect to a horizontal plane.

3. In search lamp control, the combination of an upright lamp post, a lamp supporting arm having a rocking and sliding connection between its ends with said post, a lamp and reflector carried by one end of said arm, a hollow shaft through which said post is slidable longitudinally, a bracket arm on said shaft to which the lamp supporting arm is pivotally attached, a tubular bearing head in which said hollow shaft is journaled, manually controlled means for elevating and depressing said lamp post, manually controlled means for turning said lamp post, the post elevating and depressing means embodying a swiveled extension of said post, a slidable cam track inclined with respect to a horizontal plane, and a roller carried by said swiveled extension and coöperating with said cam track.

4. In search lamp control, the combination of an upright lamp post, a lamp supporting arm having a rocking and sliding connection between its ends with said post, a lamp and reflector carried by one end of said arm, a hollow shaft through which said post is slidable longitudinally, a bracket arm on said shaft to which the lamp supporting arm is pivotally attached, a hollow casing fastened to the upper extremity of said hollow shaft and inclosing the upper portion of the lamp post, the bracket arm and part of the lamp supporting arm, said casing having a slot through which the last named arm passes.

5. In search lamp control, the combination of an upright lamp post, a lamp supporting arm having a rocking and sliding connection between its ends with said post, a lamp and reflector carried by one end of said arm, a hollow shaft through which said post is slidable longitudinally, a bracket arm on said shaft to which the lamp supporting arm is pivotally attached, a tubular bearing head in which said hollow shaft is journaled, manually controlled means for elevating and depressing said lamp post, comprising a slide rod, a cam track thereon coöperating with said lamp post, an operating cross head at one end of said rod, and latching means for said rod.

6. In search lamp control, the combination of an upright lamp post, a lamp supporting arm having a rocking and sliding connection between its ends with said post, a lamp and reflector carried by one end of said arm, a hollow shaft through which said post is slidable longitudinally, a bracket arm on said shaft to which the lamp supporting arm is pivotally attached, a tubular bearing head in which said hollow shaft is journaled, manually controlled means for elevating and depressing said lamp post, manually controlled means for turning said lamp post comprising a slide rod geared to said hollow shaft, a cross head at one end of said rod, and latching means for said rod.

In testimony whereof I affix my signature in presence of two witnesses.

JNO. LASTER COLEMAN.

Witnesses:
B. H. WILKINS,
S. T. BLACKMAN.